March 8, 1960 — A. L. EVERITT — 2,927,674
CLUTCH STRUCTURE
Filed Dec. 23, 1957

INVENTOR.
Allen L. Everitt
BY
John T. Marvin
His Attorney

United States Patent Office 2,927,674
Patented Mar. 8, 1960

2,927,674

CLUTCH STRUCTURE

Allen L. Everitt, Dayton, Ohio, assignor to General Motors Corporation, Detroit, Mich., a corporation of Delaware Application December 23, 1957, Serial No. 704,753

1 Claim. (Cl. 192—107)

This invention relates to a clutch structure, and particularly, to the use of a preloaded shear annulus of resilient material provided between flat annular surface portions carried by a clutch disc and hub, respectively.

An object of this invention is to provide a new and improved clutch structure including a radially and laterally preloaded resilient damper means permitting damping of torsional deflection of a clutch facing relative to a hub and also damping of axial deflection of a clutch facing or disc relative to a hub while cushioning engagement and smoothing out operation as well as compensating for manufacturing tolerances in the clutch structure.

Another object of this invention is to provide a preloaded shear bushing of resilient material between substantially flat annular surfaces of equal areas carried by a clutch disc and a hub, respectively, permitting both torsional and axial deflection forces of clutch facings relative to a hub to be damped by the bushing preloaded through engagement with substantially equal areas of the flat annular surfaces.

Another object of this invention is to provide a clutch structure including a hub and clutch facing on a clutch disc joined by annular plates interconnected only by a preloaded shear bushing of elastomeric material capable of being deflected radially for variable-rate torsional deflection providing constant damping and capable of being deflected laterally for creating axial pressure components to deflect and cushion axial operating forces.

Another object of this invention is to provide a sleeve damper subassembly for a clutch structure having a clutch disc and facing and having a hub maintained constantly damped relative to each other both axially and torsionally at a more uniform rate due to use of a preloaded shear elastomeric bushing pressed between flat concentric surfaces of inner and outer metallic rings forming the subassembly with the bushing and being adapted to be carried by the clutch hub and clutch disc respectively.

Further objects and advantages of the present invention will be apparent from the following description, reference being had to the accompanying drawings wherein a preferred embodiment of the present invention is clearly shown.

Figures 1, 2, 3:
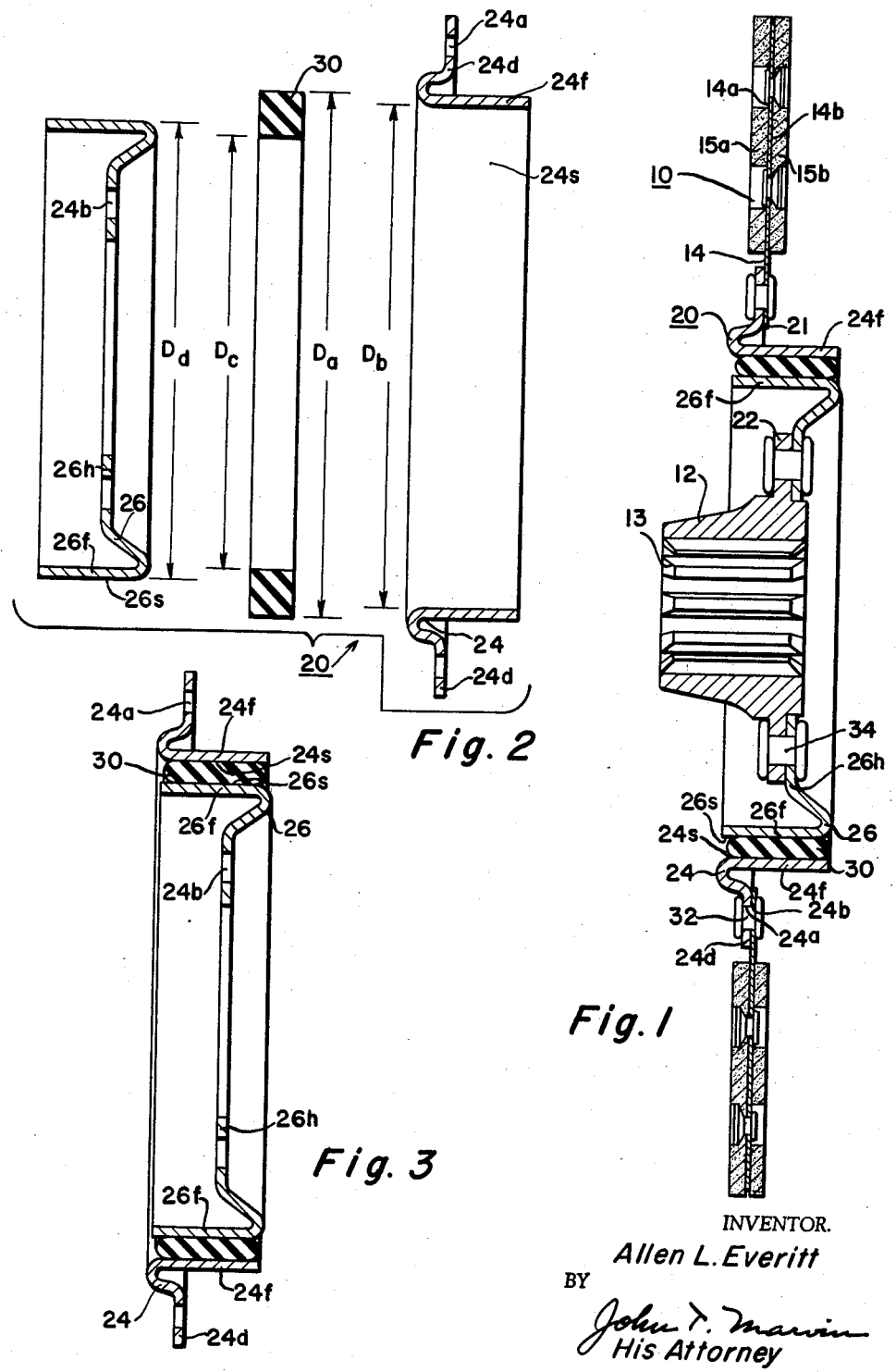
Fig. 1 is an elevational cross sectional view of a clutch structure embodying a preloaded shear bushing included in a subassembly in accordance with the present invention.
Fig. 2 is an exploded cross sectional elevational view of components of the subassembly for the clutch in Fig. 1 which includes inner and outer metallic rings having flat concentric portions between which an elastomeric bushing is to be pressed for providing both torsional and axial preloading forces.
Fig. 3 is an elevational cross-sectional view of the subassembly of a preloaded shear bushing between inner and outer rings carried concentrically relative to the bushing and using parts of Fig. 2 for use in the clutch structure of Fig. 1.

Referring to the drawings, in Fig. 1 there is shown a clutch structure generally indicated by numeral 10. This structure includes a hub 12 having internal splines 13 adapted to be engageable with external splines of a clutch driving shaft which is not part of this invention and therefore is not illustrated in the drawings. The clutch structure 10 also includes a metal clutch disc 14 having opposite surfaces 14a and 14b onto which clutch facings 15a and 15b are bonded in a usual manner. The clutch facings are preferably made of a fibrous or sintered metal type of material and are adapted to engage a machine element as the facings frictionally are pressed against such a machine element to be driven by the clutch structure of the present invention. Generally, there is likely to be a slight misalignment of the clutch facings relative to any complementary driven machine element surfaces such that a lateral deflection of the facings is necessary to accomplish a positive driving engagement with the driven element. Also, once driving engagement is established, a torsional and shearing force is transmitted between the driven element and the clutch facing supported on the clutch disc 14 or vice versa such that a twisting of the disc 14 occurs relative to an axis of rotation existing through a center of the hub 12.

The clutch structure of Fig. 1 is provided with a subassembly or sleeve-damper assembly generally indicated by numberal 20 for interconnecting a radially inner annular periphery 21 of clutch disc 14 relative to a radially outer periphery or flange portion 22 of the hub 12. This subassembly includes an outer annular member, flanged mounting means, or ring 24 and an inner annular member, flanged mounting means, or ring 26 between which there is pressed a preloaded shear bushing or annular member 30 of elastomeric material. The bushing or elastomeric ring 30 replaces metal coil springs frequently provided in previous clutch structures for counteracting torsional forces existent relative to a hub and clutch facing due to driving engagement of the clutch structure against a driven element. Such springs could counteract only torsional forces and not axial or lateral forces as well as torsional forces counteracted by the preloaded bushing in the subassembly of the clutch structure of the present invention. Also greater torsional deflection is obtained with the preloaded bushing than is possible with metal coil springs.

The subassembly 20 of the present invention comprises only the three parts, namely, the outer ring or annular member 24, the inner ring or annular member 26 and elastomeric bushing 30. The inner and outer rings are provided with laterally extending substantially flat flange portions 24f and 26f which are preformed into a cylindrical shape providing a radially inner surface 24s and a radially outer surface 26s, respectively, of substantially equal areas serving a purpose for retention of the elastomeric bushing 30 as will be more fully explained later in the specification. The flange portions 24f and 26f are concentric relative to each other and extend axially and longitudinally of the axis of rotation of hub 12. The outer mounting ring 24 is adapted to be attached to the clutch disc 14 adjacent to the radially inner periphery 21 of the clutch disc by means of a radially outwardly extending flange portion 24d which is provided with a plurality of angularly spaced apertures 24a. The inner peripheral portion of the clutch disc is provided with apertures 24b axially aligned relative to apertures 24a and adapted to receive rivets 32 inserted therethrough and crimped at opposite ends for lockng the outer radial flange portion 24d into positive engagement with the clutch disc 14.

The inner mounting means or ring 26 is provided with a radially inwardly extending flange 26h having apertures angularly spaced relative to each other and axially spaced relative to apertures provided extending axially and longitudinally through hub flange 22. Rivets 34 fitted through these apertures and having flattened heads at opposite ends serve to attach the hub flange to the radially inwardly extending flange 26h of the inner ring or member 26.

Fig. 2 shows an exploded view of the parts comprising the subassembly illustrated in Fig. 1 for the clutch structure of the present invention. The elastomeric bushing 30 as shown in Fig. 2 initially has a substantially square cross section and is provided with an outer radial diameter $D_a$ which is greater than an inner radial diameter $D_b$ of the flange portion 24f at surface 24s of the member 24. The bushing 30 has a radial inner diameter $D_c$ smaller than a radial outer diameter $D_d$ of surface 26s of flange 26f of member 26. The members 24 and 26 are preassembled with the ring 30 pressed concentrically between surfaces 24s and 26s in a single press fitting operation resulting in a subassembly clearly shown in Fig. 3. It is obvious that the subassembly of Fig. 3 is the same as that illustrated with the completed clutch structure including the clutch facings and clutch disc riveted to member 24 and clutch hub 12 riveted to member 26.

The subassembly for the clutch structure of the present invention shows the elastomeric bushing 30 deformed in a manner resulting in radially compressing the bushing and laterally spreading opposite lateral sides of the bushing. The elastomeric material, rubber or synthetic rubber used for the bushing 30 when assembled as illustrated in Figures 1 and 3 is highly compressed and in a state of preloaded shear which provides a degree of constant torsional and axial damping of outer sleeve member 24 relative to the inner member 26. Previous clutch structures have been provided having rubber interposed between a clutch disc and hub for providing torsional deflection alone. But none of such previous structures have provided a preloaded bushing in which the elastomeric material is deformed both radially and laterally or axially for creating components of force acting through the rubber against torsional components of force between the hub and clutch facings as well as axial or lateral components of force between the hub and clutch facings whereby the rubber or elastomeric bushing or mounting serves dual functions of damping both torsional and lateral forces.

Due to the preloading of the bushing 30 by deformation of the elastomeric material as indicated in Figures 1 and 3, it is necessary that the flange portions 24f and 26f have annular surface areas 24s and 26s, respectively, substantially equal to each other. The subassembly shown in Fig. 3 having such equal area surfaces remains in concentric assembled relation once press-fitted together and lateral and radial forces inherently existent in the deformed and preloaded rubber bushing are balanced relative to each other so that the outer member 24 and inner member 26 will not be shifted or separated laterally or axially relative to each other due to forces within the preloaded bushing. The union or subassembly can be made quickly using the equal surface areas such that actually the preloaded bushing provides forces to resist disassembly. When the bushing 30 is not mounted between substantially equal surface areas when assembled in a preloaded condition, there is a tendency for the inner and outer mounting members to shift laterally relative to each other due to forces within the preloaded bushing and such a lateral shifting would result in a separation or exploding of the parts of the subassembly relative to each other. Since there are substantially equal areas in the surfaces 24s and 26s, any axial play or shifting movement transmitted through the clutch facings to the clutch disc inner lateral portion are compensated for by damping forces of the preloaded bushing so that no axial or radial forces of any consequence are transmitted to the inner mounting or ring 26 and hub 12. Also, the preloading of the bushing 30 as illustrated in Figures 1 and 3 provides forces for cushioning engagement and smoothing out of any torsional deflection in shear which may be transmitted as the clutch facings frictionally engage a driven element for causing rotation therewith due to driving force transmitted thereto through clutch disc 14 by way of subassembly 20 carried between hub 12 and the clutch disc. A constant damping and better torsional deflection at a more uniform rate are provided and permitted in the clutch structure through use of the preloaded bushing in accordance with the present invention. Thus rubber in shear cushions both torsional and axial shock loading of the clutch disc with facing material carried thereon relative to the hub.

The rubber or elastomeric material 30 can be bonded such as by vulcanizing or cementing to either or both contacting flat concentric flanges 24f—26f of parts 24—26 or may be held under compression therebetween due to press fitting of the parts into subassembled relation as shown in Figures 1 and 3 where the bushing is shown preloaded and having a substantially rectangular cross section between surfaces 24s and 26s.

It is to be noted that preloaded rubber does not age and lose its "life" or inherent resilience as readily as unstressed rubber and that therefore it is advantageous to use the bushing 30 in a condition of preloaded shear both for the dual functional features of damping both torsional and lateral or axial forces as well as for maintaining the inherent resilience and "life" of the rubber. Use of the preloaded and pre-stressed rubber or elastomeric material provides damping of possible torsional movement as well as axial movement in the subassembly between the hub and clutch disc for the clutch structure of the present invention. The concentric surfaces of substantially equal area permit quick assembly in a short period of time and also permit the bushing to be preloaded in a subassembly including as few parts as possible.

While the embodiments of the present invention constitute a preferred form, it is to be understood that other embodiments may be adapted.

What is claimed is as follows:

A clutch structure adapted to engage a machine element where there is likely to be a slight misalignment of clutch facings relative to any complementary machine element surface such that a lateral deflection of the facings is necessary to accomplish an initial driving engagement therebetween, comprising, a metal clutch disc having facing material carried on opposite sides thereof and adapted to engage a machine element axially thereof, said disc having an annular inner periphery, a hub concentrically spaced inside the inner periphery of said disc and adapted to be rotated, a subassembly between said clutch disc and said hub and including three parts, namely, first, an outer annular member of stamped sheet metal having a radially outwardly extending flange portion as well as a radially inner axially extending annular flange having a smooth cylindrical radially inner surface, means attaching said radially outwardly extending flange portion adjacent to the annular periphery of said metal clutch disc, second, an inner annular member of stamped sheet metal having a radially inwardly extending flange portion as well as a radially outer axially extending annular flange having a smooth cylindrical radially outer surface, said axial flanges defining annular space therebetween thereby forming open ends, means attaching said radially inwardly extending flange portion to said hub, both said inner and outer smooth cylindrical surfaces having substantially equal areas located concentrically relative to each other between opposite annular open ends, the axial length of both said inner and outer surfaces being the same, and, third, a prestressed ring member adapted as a preloaded shear bushing of resilient material provided concentrically between said axially-equal-length inner and outer smooth cylindrical surfaces and in engagement therewith under force relative to said inner and outer smooth cylindrical surfaces between the opposite open ends so that said inner and outer members are held solely by said prestressed ring member of resilient material against shifting and separating laterally and axially relative to each other due to forces within said prestressed ring member and whereby said prestressed ring member serves dual functions of damping both torsional and lateral forces including force due to initial shock of engagement of the facings relative to a machine element where there is slight misalignment compensated for by damping forces of said prestressed ring member, said prestressed ring member being pressed having axially free ends adjacent to the opposite open ends between said inner and outer smooth cylindrical surfaces, said prestressed ring member being in a condition radially compressed from an original substantially square cross section to a substantially rectangular cross section expanded laterally and axially between said smooth cylindrical axially-equal-length surfaces thereby maintaining inherent resilience and "life" of the resilient material due to preloading whereby unhindered dual functioning for damping both torsional and lateral as well as axial forces upon said clutch structure is also realized.

References Cited in the file of this patent

UNITED STATES PATENTS

| | | |
|---|---|---|
| 1,896,968 | Paton | Feb. 7, 1933 |
| 2,065,601 | Meyer | Dec. 29, 1936 |
| 2,107,689 | Bugatti | Feb. 8, 1938 |
| 2,715,822 | Anderson | Aug. 23, 1955 |
| 2,828,616 | Zeigler et al. | Apr. 1, 1958 |

FOREIGN PATENTS

| | | |
|---|---|---|
| 313,851 | Great Britain | Aug. 7, 1930 |
| 933,467 | France | Jan. 1, 1948 |